US 9,222,570 B2

(12) United States Patent
Fukuda et al.

(10) Patent No.: US 9,222,570 B2
(45) Date of Patent: Dec. 29, 2015

(54) POWER TRANSMISSION APPARATUS (71) Applicant: GKN Driveline Japan Ltd., Tochigi (JP)

(72) Inventors: Hiromichi Fukuda, Tochigi (JP); Atsushi Kawano, Tochigi (JP)

(73) Assignee: GKN DRIVELINE JAPAN LTD., Tochigi (JP)

( * ) Notice: Subject to any disclaimer, the term of this patent is extended or adjusted under 35 U.S.C. 154(b) by 217 days.

(21) Appl. No.: 13/768,569

(22) Filed: Feb. 15, 2013

(65) Prior Publication Data

US 2013/0205930 A1 Aug. 15, 2013

(30) Foreign Application Priority Data

Feb. 15, 2012 (JP) .................................. 2012-030713

(51) Int. Cl.
| *F16H 57/021* | (2012.01) |
| *F16H 57/037* | (2012.01) |
| *B60K 17/344* | (2006.01) |
| F16H 57/02 | (2012.01) |

(52) U.S. Cl.
CPC ............ *F16H 57/021* (2013.01); *B60K 17/344* (2013.01); *F16H 57/037* (2013.01); *F16H 2057/02052* (2013.01); *F16H 2057/02086* (2013.01); *Y10T 74/19642* (2015.01)

(58) Field of Classification Search
CPC ................ F16H 57/037; F16H 57/021; F16H 2057/02052; F16H 2057/02086
USPC ........................................ 74/424, 650, 606 R
See application file for complete search history.

(56) References Cited

U.S. PATENT DOCUMENTS

| 5,941,136 A | * | 8/1999 | Kusukawa et al. | .......... 74/606 R |
| 2006/0219037 A1 | * | 10/2006 | Inose et al. | ....................... 74/424 |
| 2008/0113843 A1 | * | 5/2008 | Kenmotsu et al. | ............. 475/222 |
| 2011/0039652 A1 | | 2/2011 | Ekonen et al. | |

FOREIGN PATENT DOCUMENTS

| JP | 2005233374 A | 9/2005 |
| JP | 2008-164123 A | 7/2008 |

OTHER PUBLICATIONS

English Patent Abstract for JP 2005233374 from esp@cenet, Publication Date: Sep. 2, 2005 (1 Page).

* cited by examiner

*Primary Examiner* — William Kelleher
*Assistant Examiner* — Thomas Magnuson
(74) *Attorney, Agent, or Firm* — Osha Liang LLP (57) ABSTRACT

A power transmission apparatus includes a case having a first member and a second member. A first shaft extending in a first direction and a second shaft extending in a second direction intersecting with the first direction are accommodated in the case. A fastener for fastening the first member and the second member to each other is inserted through a hole formed in the first member. A bearing support part for supporting the second shaft is formed in the first member. In a third direction perpendicular to both of the first direction and the second direction, a whole of the hole is positioned in one side in the third direction than an inner peripheral end of the bearing support part in the one side in the third direction.

9 Claims, 6 Drawing Sheets

POWER TRANSMISSION APPARATUS

BACKGROUND OF THE INVENTION

1. Field of the Invention

The invention relates to a power transmission apparatus.

2. Related Art

JP-A-2005-233374 discloses a power transmission apparatus.

The power transmission apparatus is used as a transfer apparatus mounted in a front wheel-side of a four-wheel driving vehicle. A first rotary member and a second rotary member are rotatably supported in a transfer case, which serves as a case of the power transmission apparatus, by bearings. The first rotary member and the second rotary member interlock with each other by an engagement of a pair of bevel gears (ring gear and pinion gear).

The transfer case is divided into a case body and a case cover which are mainly arranged in a width direction of the transfer case. The case body and the case cover are joined with each other on mating surfaces thereof and are fastened by a plurality of bolts.

In the transfer apparatus, the mating surfaces are positioned at an outer periphery side of one of bearings supporting the first rotary member.

The mating surfaces of the transfer case should be formed with bolt holes, into which the bolts are screw-engaged, in a thickness part of the transfer case in the width direction and the transfer case protrudes outwards in the width direction, so that the transfer case is enlarged in the width direction. In contrast, if the mating surfaces are moved inwards in the width direction so as to suppress the enlargement of the transfer case in the width direction, it is not possible to form the bolt holes, into which the bolts are screw-engaged, in the thickness part of the transfer case and the bolt holes penetrate into an inside of the transfer case. As a result, it is difficult to make the transfer case smaller.

SUMMARY OF THE INVENTION

According to embodiments, a small sized transmission apparatus is provided.

DETAILED DESCRIPTION OF THE EMBODIMENTS

<First Exemplary Embodiment>

Figure 1:
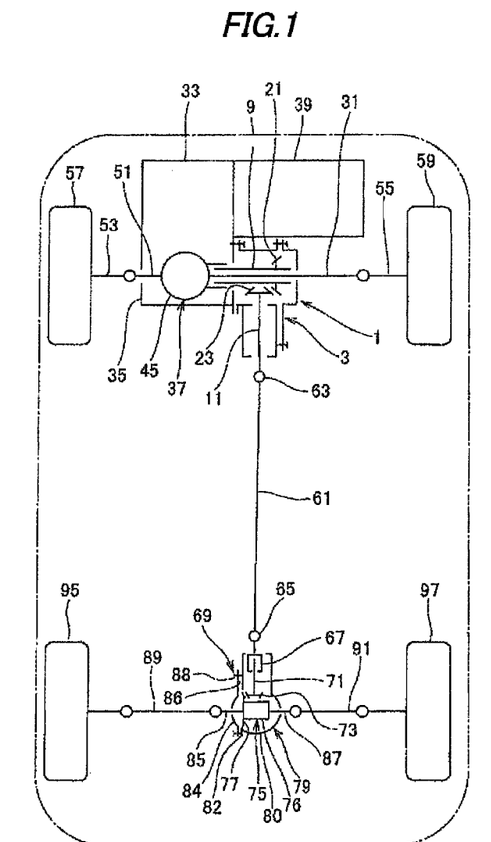
FIG. 1 is a skeletal view of a four-wheel driving vehicle (First Exemplary Embodiment).

FIG. 1 is a plan sectional view showing a skeleton of a four-wheel driving vehicle.

As shown in FIG. 1, a transfer apparatus 1 that is a power transmission apparatus of the First Exemplary Embodiment is disposed on an outer periphery of a front intermediate shaft 31 at a front wheel-side. A transfer case 3 of the transfer apparatus 1 is attached to a bell housing 35 of a transmission 33.

In the bell housing 35, a front differential apparatus 37 is supported. The front differential apparatus 37 is input with a driving input from an engine 39 via the transmission 33.

The driving input through the transmission 33 is performed for a front differential case 45 via a ring gear.

Left and right side gears that are output parts of the front differential apparatus 37 are coupled with front intermediate shafts 51, 31 at an axle-side, respectively. The respective front intermediate shafts 51, 31 are coupled to left and right front wheel axles 53, 55, thereby connecting the front differential apparatus 37 and the front wheel axles 53, 55.

The transfer apparatus 1 distributes the driving input to the front differential apparatus 37 to rear wheels. The front intermediate shaft 31 is arranged to penetrate the transfer case 3 of the transfer apparatus 1. The front wheel axles 53, 55 are interlockingly connected to left and right front wheels 57, 59, respectively.

In the transfer case 3, a connecting hollow shaft 9 extends from the front differential case 45 of the front differential apparatus 37. The connecting hollow shaft 9 is integrally rotatably coupled to the front differential case 45 by a spline coupling or the like.

The connecting hollow shaft 9 is loosely fitted onto the outer periphery of the front intermediate shaft 31. A ring gear 21 is attached to the connecting hollow shaft 9. The ring gear 21 is meshed with a pinion gear 23 on a rear wheel-side output shaft 11. The ring gear 21 and the pinion gear 23 are formed by bevel gears and are orthogonally meshed. Thereby, the rear wheel-side output shaft 11 is arranged orthogonally to the connecting hollow shaft 9.

A front end of a propeller shaft 61 is coupled to the rear wheel-side output shaft 11 via a universal joint 63. A rear end of the propeller shaft 61 is coupled to a coupling 67, which transfers torque on demand, via a universal joint 65. A drive pinion shaft 71 of a final deceleration apparatus 69-side is coupled to the coupling 67.

The drive pinion shaft 71 has a pinion gear 73 and the pinion gear 73 is meshed with a ring gear 77 of a rear differential apparatus 75.

The rear differential apparatus 75 is rotatably supported to a carrier case 79.

Left and right side gears of the rear differential apparatus 75 are coupled with rear intermediate shafts 85, 87. Left and right rear wheel axles 89, 91 are coupled to the rear intermediate shafts 85, 87. Left and right rear wheels 93, 95 are interlockingly connected to the rear wheel axles 89, 91.

When torque is input from the engine 39 to the ring gear of the front differential apparatus 37 via the transmission 33, the torque is transferred to the left and right front wheels 57, 59 through the front intermediate shafts 51, 31 and the front wheel axles 53, 55 at one side. At the other side, the torque is transferred to the rear wheel-side output shaft 11 through the front differential case 45, the connecting hollow shaft 9, the ring gear 21 and the pinion gear 23.

From the rear wheel-side output shaft 11, the torque is transferred to the ring gear 77 of the rear differential apparatus 75 via the propeller shaft 61, the coupling 67, the drive pinion shaft 71 and the pinion gear 73. From the rear differential apparatus 75, the torque is transferred to the left and right rear wheels 95, 97 via the rear intermediate shafts 85, 87 and the left and right rear wheel axles 89, 91.

By the above torque transfer, the vehicle can travel with an on-demand four-wheel driving state by the front and rear wheels 57, 59, 95, 97.

Figure 2:
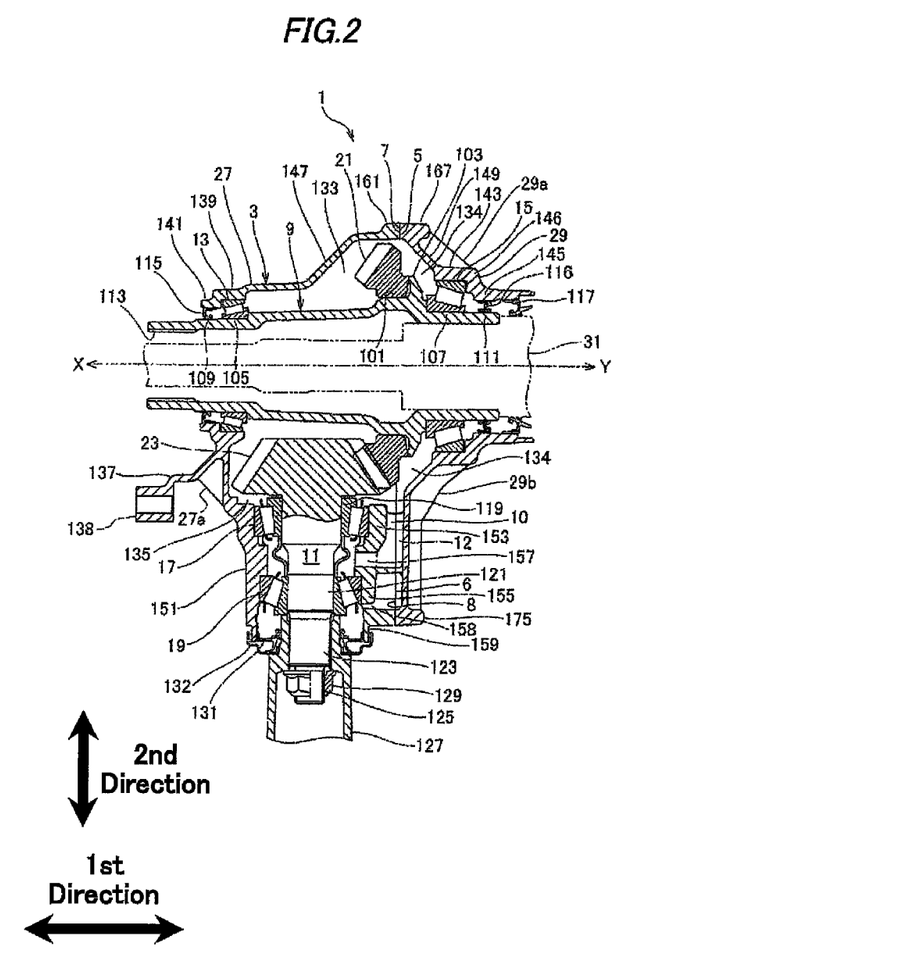
FIG. 2 is a plan sectional view of a transfer apparatus (First Exemplary Embodiment).
Figure 3:
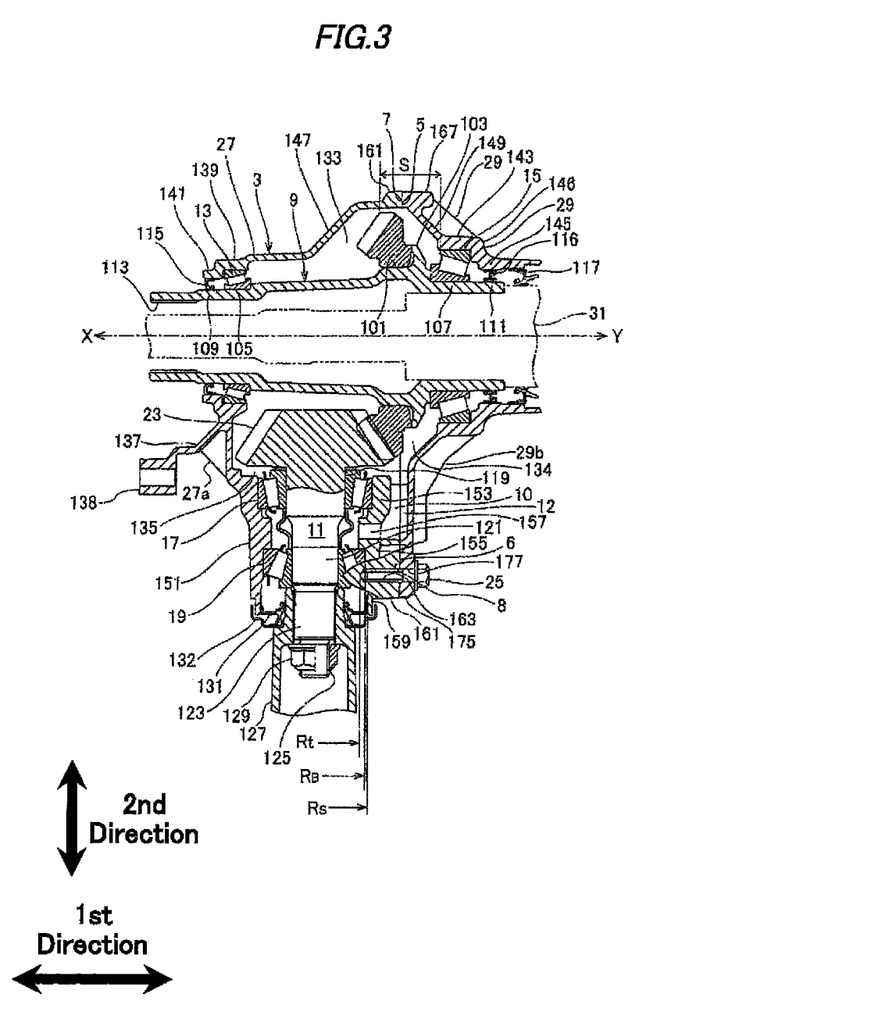
FIG. 3 is a plan sectional view of the transfer apparatus (First Exemplary Embodiment).
Figure 4:
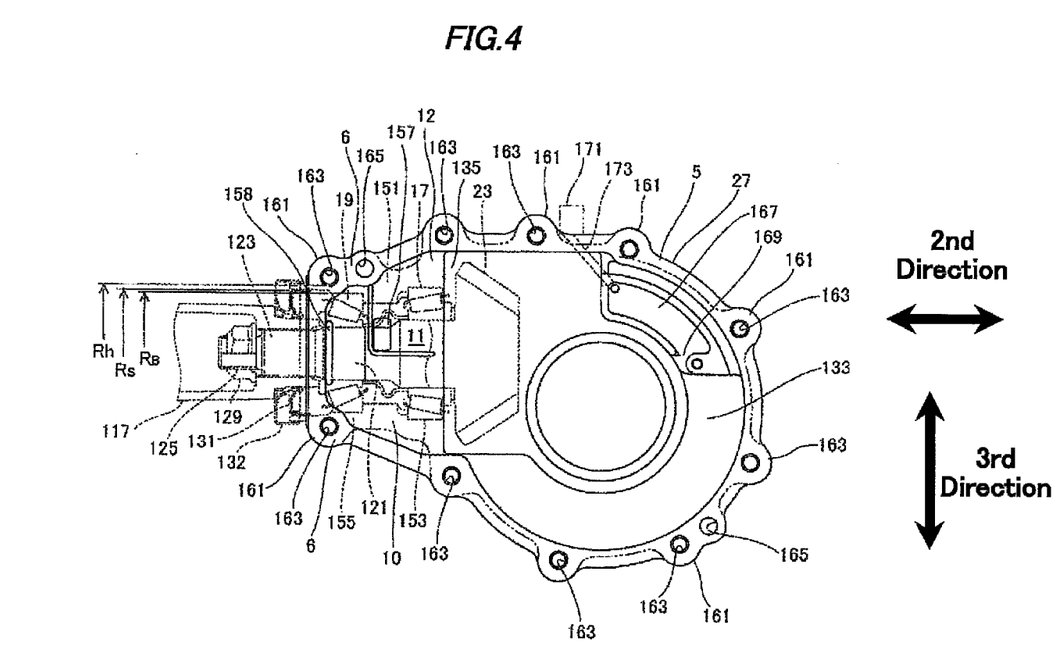
FIG. 4 is a side view of the transfer apparatus in which a cover is removed (First Exemplary Embodiment).

FIG. 2 is a plan sectional view of the transfer apparatus, FIG. 3 is a plan sectional view of the transfer apparatus and FIG. 4 is a side view of the transfer apparatus in which a cover is removed. In FIG. 3, a partial sectional point is changed from the view of FIG. 2 so that a cover fastening by a bolt is seen. In FIGS. 2 and 3, a reference numeral X indicates an axially one side X of the connecting hollow shaft 9 along an axial direction. A reference numeral Y indicates the other side in the same axial direction. The reference numerals X and Y are also applied when describing the axial positional relations of the other members such as the intermediate shaft 31, the transfer case 3 and the ring gear 21.

As shown in FIGS. 2 to 4, the connecting hollow shaft 9 and the rear wheel-side output shaft 11, which are orthogonally arranged, are respectively rotatably supported to the transfer case 3 by first and second taper roller bearings 13, 15, and third and fourth taper roller bearings 17, 19.

The second taper roller bearing 15 has an outer diameter larger than that of the first taper roller bearing 13, and the fourth taper roller bearing 19 has an outer diameter smaller than that of the third taper roller bearing 17.

The connecting hollow shaft 9 is formed with a press-fitting surface 101 at an axially intermediate part thereof and has a flange part 103 at one side of the press-fitting surface 101. The ring gear 21 is press-fitted into the press-fitting surface 101 and a back side of a boss part of the ring gear 21 is put into contact with the flange part 103, then mating surfaces thereof facing each other in the axial direction are welded from an outer diameter-side toward a rotational center-side by a welding means such as electron beam welding.

Therefore, the ring gear 21 can be made to be small. Thereby, it is possible to make the transfer case 3 smaller and also to reduce the inertia resistance due to the ring gear 21.

The connecting hollow shaft 9 has a hollow stepped shape and is formed with bearing fitting parts 105, 107, seal support parts 109, 111, an inner spline 113 for coupling and the like.

The bearing fitting parts 105, 107 of the connecting hollow shaft 9 are fitted with the first and second taper roller bearings 13, 15, which are rotatably supported to the transfer case 3. The seal accommodation parts 109, 111 are closely contacted to oil seals 115, 116 attached to the transfer case 3.

The rear wheel-side output shaft 11 is integrally formed with the pinion gear 23. The pinion gear 23 is orthogonally meshed with the ring gear 21. At this meshing state, the rear wheel-side output shaft 11 is offset arranged relative to the connecting hollow shaft 9 so that a rotational center of the pinion gear 23 is higher than a rotational center of the ring gear 21.

Accordingly, it is possible to reduce a scraping resistance of lubricating oil in the transfer case 3 due to the pinion gear 23.

The rear wheel-side output shaft 11 is formed with stepped bearing fitting parts 119, 121. A fitting part 123 and a male screw part 125 are sequentially formed at an end portion thereof.

The bearing fitting parts 119, 121 of the rear wheel-side output shaft 11 are fitted with the third and fourth taper roller bearings 17, 19, which are rotatably supported to the transfer case 3. The fitting part 123 at the end portion is fitted with a coupling member 127, which is fastened by a nut 129 to be screw-engaged with the male screw part 125 so as to apply a pressure to the third and fourth taper roller bearings 17, 19.

The coupling member 127 is closely contacted with an oil seal 131 attached to the transfer case 3. A dust cover 132 fixed to the coupling member 127 covers the oil seal 131.

The transfer case 3 is a dividable structure having a case body 27 and a case cover 29. The case body 27 and the case cover 29 are coupled with each other by joining mating surfaces 5, 7 intersecting with the axial direction of the connecting hollow shaft 9.

In the First Exemplary Embodiment, the mating surfaces 5, 7 overlap with the outer diameter side of the ring gear 21m so that the transfer case 3 is suppressed from protruding in the axial direction of the connecting hollow shaft 9 and thus enable the apparatus to be made smaller. A range S within which positions of the mating surfaces 5, 7 can be shifted in the axial direction of the connecting hollow shaft 9 is up to a position of a bearing support part 153 of a third taper roller bearing 17.

If the case 3 is divided at an axial range of a bearing support part 143 of the second taper roller bearing 15, a functionality is deteriorated. Thus, it is impossible to arrange the mating surfaces 5, 7 at the axial range corresponding to the second taper roller bearing 15. In contrast, if the transfer case 3 is divided at the outer diameter-side of the bearing support part 143, the positions of the mating surfaces 5, 7 protrude outwards in the axial direction. Accordingly, in order to suppress the enlargement of the transfer case 3, an end of the range S of the axial positions of the mating surfaces 5, 7 in the axially other side Y is positioned at an axially inner side (i.e. the axially one side X of the connecting hollow shaft 9) of the bearing support part 143.

If the positions of the mating surfaces 5, 7 are moved towards the axially one side X of the connecting hollow shaft 9, the mating surfaces 5, 7 reach the bearing support part 153 of the third taper roller bearing 17. Since the bearing support part 153 must reliably maintain the third taper roller bearing 17 supporting the rear wheel-side output shaft 11, it is not proper to arrange the mating surfaces 5, 7 at the bearing support part 153 by cutting out an outer periphery of the bearing support part 153, from a standpoint of the support stability. Hence, an end of the range S of the axial positions of the mating surfaces 5, 7 in the axially one side X is set in such a position where the outer periphery of the bearing support part 153 of the third taper roller bearing 17 is not cut out and an outer periphery thickness is made up to a range within which a meshing reactive force of the pinion gear 23 is appropriately kept.

By doing so, the mating surfaces 5, 7 of the case body 27 and the case cover 29 are shifted to be close to the rear wheel-side output shaft 11 within the range S in the axial direction of the connecting hollow shaft 9.

The transfer case 3 has first and second accommodation parts 133, 135 in a side of the case body 27 and a third accommodation part 134 in a side of the case cover 29. The case body 27 is arranged with the mating surface 5 at the axially other side Y and is formed with an attachment bracket part 137 to be fixed to the bell housing 35 of the transmission 33 at the axially one side X in the axial direction of the connecting hollow shaft 9. The rear wheel-side output shaft 11 is interposed between the mating surface 5 and the attachment bracket part 137 in the axial direction of the connecting hollow shaft 9. The attachment bracket part 137 and the like configure a case-side attachment fastening part 138. A rib 27a is formed between the case body 27 and the attachment bracket part 137.

The attachment bracket part 137 and the like are joined with an attachment part of the bell housing 35 of the transmission 33 and the case-side attachment fastening part 138 is fastened to a fastening part of the bell housing 35 by a bolt and the like, so that the transfer apparatus 1 is fixed.

The first accommodation part 133 accommodates therein the axially one side X of the connecting hollow shaft 9, the gear part of the ring gear 21 and the first taper roller bearing 13. The second accommodation part 135 accommodates therein the pinion gear 23 and the rear wheel-side output shaft 11.

In the first accommodation part 133, a bearing support part 139 and a seal support part 141 are provided to the case body 27 at the axially one side X of the ring gear 21. The third accommodation part 134 accommodates therein a part of the axially other side Y of the connecting hollow shaft 9 and the second taper roller bearing 15. At the axially other side Y of the ring gear 21, a bearing support part 143 and a seal support part 145 are provided to the case cover 29.

Therefore, the case cover 29 has a support cylinder part 146 having the bearing support part 143 for supporting the second taper roller bearing 15 and the seal support part 145 at the axially other side Y than the mating surface 7. Thereby, it is possible to improve the strength of the transfer case 3.

The first and second taper roller bearings 13, 15 that are fitted to the connecting hollow shaft 9 are supported to the bearing support parts 139, 143. The oil seals 115, 116 are supported to the seal support parts 141, 145. The oil seal 117 is supported to the seal support part 145 at a more axially outer side than the oil seal 116. The oil seal 117 is closely contacted to the front intermediate shaft 31.

In the first and third accommodation parts 133, 134, the case body 27 and the case cover 29 are formed with slope parts 147, 149 conforming to an outward appearance of the ring gear 21. The slope part 149 of the case cover 29 is formed with a rib 29a. The rib 29a extends from a cover-side fastening part 167 to the support cylinder part 146.

Therefore, the case cover 29 that is the second case member has a configuration having the slope part 149 whose diameter is enlarged from the axially other side Y of the connecting hollow shaft 9, which is the first rotary shaft, towards the axially one side X having the mating surface 7.

Therefore, it is possible to improve the strength of the transfer case 3.

Also, at a side of the second accommodation part 135, the case cover 29 is formed with a rib 29b. The rib 29b extends from the cover-side fastening part 167 to the support cylinder part 146.

In the second accommodation part 135, a shaft support cylinder part 151 is formed at a side of the rear end portion of the case body 27. The bearing support parts 153, 155 are formed at the shaft support cylinder part 151. At one side of the shaft support cylinder part 151, the case body 27 is formed with an oil passage 157 that communicates from a space of a side of the pinion gear 23 to a portion between the third and fourth taper roller bearings 17, 19. An oil passage 158 that communicates between the fourth taper roller bearing 19 and the oil seal 131 is also formed in the case body 27. An outer end of the shaft support cylinder part 151 is formed with a seal support part 159.

The third and fourth taper roller bearings 17, 19 that are coupled to the rear wheel-side output shaft 11 are supported to the bearing support parts 153, 155. The oil seal 131 is supported to the seal support part 159.

As shown in FIG. 4, the mating surface 5 of the case body 27 is formed to surround the first and second accommodation parts 133, 135. The mating surface 5 is formed with a plurality of body-side fastening parts 161 at a predetermined interval. The body-side fastening parts are respectively formed with bolt holes 163. The mating surface 5 is formed with knock holes 165 that align the case body 27 and the case cover 29 at the respective first and second accommodation parts 133, 135.

At a side of a rear end portion of the second accommodation part 135, the mating surface 5 (the rear end side of the part 6 positioned at a side of the rear wheel-side output shaft 11) is arranged between the shaft support cylinder part 151 and the seal support part 159. At a rear end of a side of the second accommodation part 135, the bolt holes 163 are disposed at two upper and lower locations with the rotational center of the rear wheel-side output shaft 11 being interposed therebetween. The bolt holes 163 are formed at more outward sides than an inner diameter of the rear end portion of the shaft support cylinder part 151. That is, the parts 6, 8 of the mating surfaces 5, 7 positioned at the side of the rear wheel-side output shaft 11 are joined with each other at an outer diameter-side of an outer race of the fourth taper roller bearing 19, so that the positions of the bolt holes formed at the two upper and lower locations are aligned. The case body 27 and the case cover 29 are then fastened by the bolts 25.

Therefore, the mating surfaces 5, 7 of the case body 27 and the case cover 29 are formed to be close to a side of the rear wheel-side output 11 within the range S in the axial direction of the connecting hollow shaft 9, and then the parts 6, 8 continuing from the mating surfaces 5, 7 are fastened by the bolts 25. Since it is possible to arrange the mating surfaces 5, 7 of the transfer case 3 to be close to the ring gear 21, it is possible to miniaturize the transfer case 3 in the axial direction of the connecting hollow shaft 9, thereby improving the vehicle mount capability.

That is, as shown in FIG. 4, the bolt hole 163 in the rear end portion of a side of the second accommodation part 135 is configured so that a radial distance $R_h$ from the rotational center of the rear wheel-side output shaft 11 to an inner peripheral end of the bolt hole 163 in a radial direction of the rear wheel-side output shaft 11 is larger than a radius $R_B$ of an inner periphery of the bearing support part 155 (which is the substantially same as a radius of the outer race of the fourth taper roller bearing 19) having a relatively smaller diameter. In addition, the radial distance $R_h$ from the rotational center of the rear wheel-side output shaft 11 to the inner peripheral end of the bolt hole 163 in the radial direction of the rear wheel-side output shaft 11 is larger than a radius $R_s$ of an inner periphery of the seal support part 159. In the drawings, the description is made using the radiuses. However, the above is also the same even using the diameters.

Therefore, it is possible to dispose the mating surfaces 5, 7 of the transfer case 3 to be close to a side of the ring gear 21. Thereby, it is possible to miniaturize the transfer case 3 in the axial direction of the connecting hollow shaft 9, thereby improving the vehicle mount capability.

Also, in the accommodation part 133, the case body 27 is formed with a breather chamber 167. The breather chamber 167 faces an inner wall surface of a side of the case cover 29, is spaced from the ring gear 21 in the axially one side X direction and opens towards the ring gear 21. A closing plate is attached to a leading end surface of the opening by using a screw and the like, thereby forming a closed space. Also, a penetration part 169 communicating with the first accommodation part 133 and a communication hole 173 communicating with an outer breather 171 are formed.

The mating surface 7 of the case cover 29 also has the same shape as the mating surface 5 and is formed with case-side fastening parts 175 and bolt insertion through-holes 177 in correspondence to the body-side fastening parts 161 and the bolt holes 163.

The mating surface 7 of the case cover 29 is joined with the mating surface 5 of the case body 27 and the fastening parts 161, 175 are fastened by the bolts 25, so that the case cover 29 is fixed to the case body 27.

The case body 27 and the case cover 29 are formed with recess portions 10, 12 that are surrounded by the parts 6, 8 of the mating surfaces 5, 7 positioned in a side of the rear wheel-side output shaft 11. The recess portions 10, 12 communicate with the first and second accommodation parts 133, 134 and oil passages 157, 158 in the transfer case 3.

As shown in FIG. 3, a distance $R_t$ from the rotational center of the rear wheel-side output shaft 11 to a leading end of the bolt hole 163 in the radial direction of the rear wheel-side output shaft 11 is set to be smaller than the radius $R_B$ of the inner periphery of the bearing support part 155 and the radius $R_s$ of the inner periphery of the seal support part 159.

That is, the bolt 25 is disposed at a more outer diameter-side than the inner diameter of the shaft support cylinder part 151 of the transfer case 3, which supports the fourth taper roller bearing 19.

Therefore, it is possible to miniaturize the mating surfaces 5, 7 of the transfer case 3 in the axial direction of the connecting hollow shaft 9 of the transfer case 3, thereby improving the vehicle mount capability.

Also, it is possible to securely support the rear wheel-side output shaft 11 relative to the case body 27 and to extend the mating surfaces 5, 7 of the case body 27 and the case cover 29 in the axial direction of the rear wheel-side output shaft 11, as the same mating surfaces as the parts 6, 8 positioned at the rear wheel-side output shaft 11-side, thereby improving the strengths of the first and second case members.

Furthermore, it is possible to arrange the mating surfaces 5, 7 of the transfer case 3 to be close to the ring gear 21. Therefore, it is possible to suppress a weight of the transfer apparatus 1 from being biased towards the axially other side of the connecting hollow shaft 9, thereby reducing the vibration of the apparatus after the mount.

By doing so, the case body 27 of the transfer apparatus 1 accommodates therein the axially one side X of the connecting hollow shaft 9, the first taper roller bearing 13, the rear wheel-side output shaft 11 and the third and fourth taper roller bearings 17, 19. The case cover 29 accommodates therein the axially other side Y of the connecting hollow shaft 9 and the second taper roller bearing 15.

The mating surfaces 5, 7 are arranged between the first and second taper roller bearings 13, 15 in the axial direction of the connecting hollow shaft 9 and extend towards the outer peripheries of the third and fourth taper roller bearings 17, 19 along the axial direction of the rear wheel-side output shaft 11.

The parts 6, 8 of the mating surfaces 5, 7 positioned in the side of the rear wheel-side output shaft 11 are joined with each other at the larger diameter-side than the fourth taper roller bearing 19 and are fastened by the bolts 25.

That is, according to the transfer apparatus 1, it is possible to easily divide the case.

<Second Exemplary Embodiment>

Figure 5:
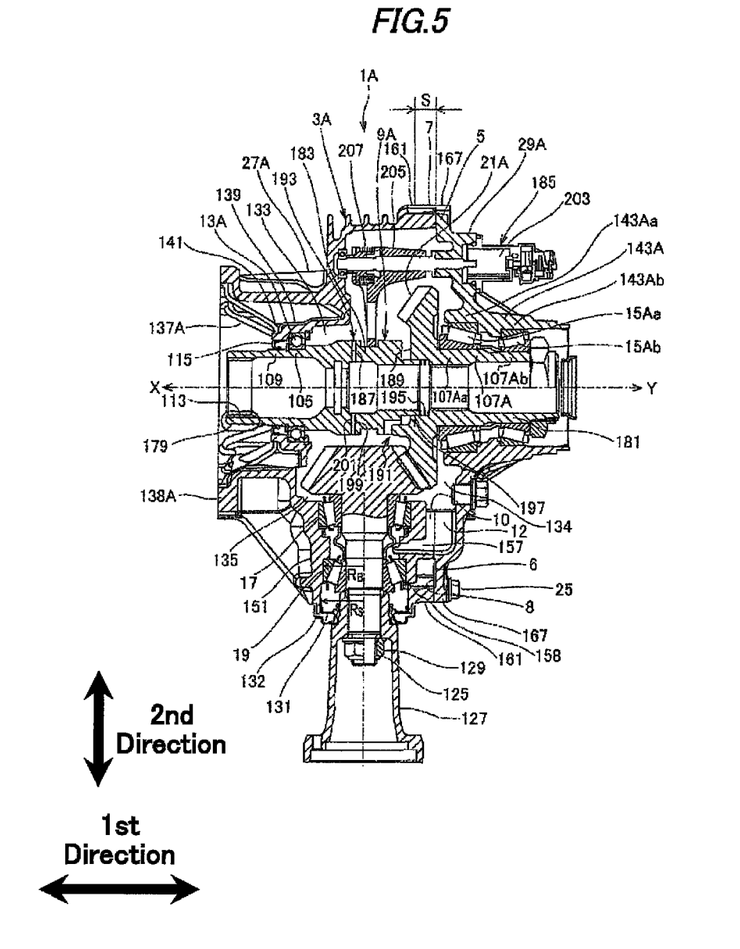
FIG. 5 is a plan sectional view of a transfer apparatus (Second Exemplary Embodiment).
Figure 6:
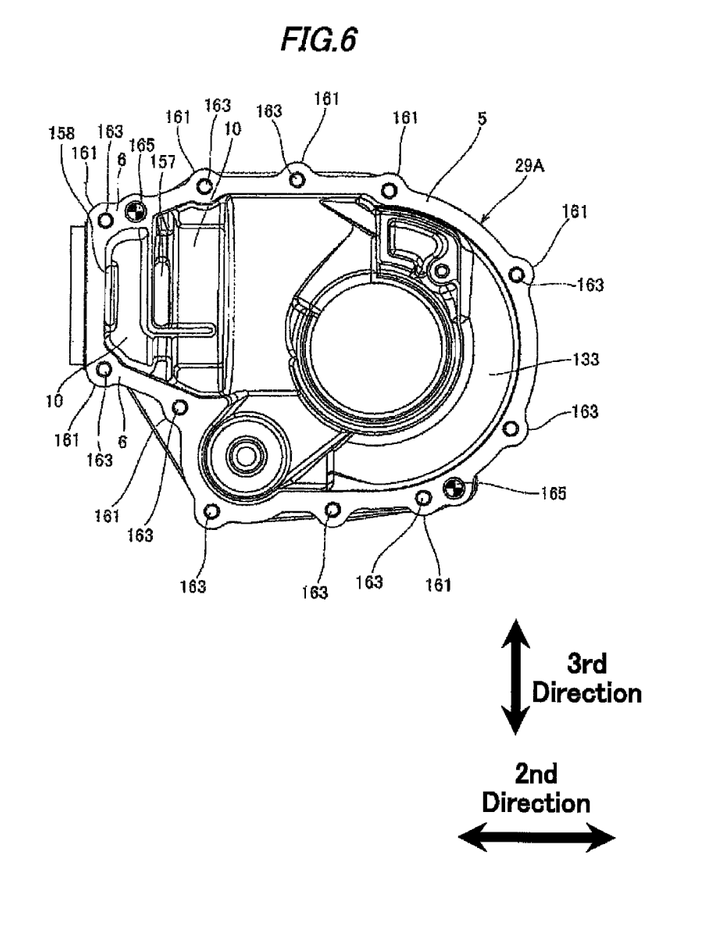
FIG. 6 is a side view of the transfer apparatus in which a cover is removed (Second Exemplary Embodiment).

FIGS. 5 and 6 relate to a Second Exemplary Embodiment. FIG. 5 is a plan sectional view of a transfer apparatus and FIG. 6 is a side view of the transfer apparatus in which a cover is removed. The same parts as those of the First Exemplary Embodiment are indicated with the same reference numerals, the corresponding constitutional parts are indicated with the same reference numerals having 'A' attached thereto and the overlapping descriptions are omitted.

A reference numeral 'X' in FIG. 5 indicates an axially one side of a first rotary shaft 9A along an axial direction. A reference numeral Y indicates the other side in the axial direction. The reference numerals X and Y are also applied when describing the axial positional relations of the other members to be coaxially arranged such as the intermediate shaft 31, a transfer case 3A and a ring gear 21A.

In the Second Exemplary Embodiment, the first rotary shaft 9A of the transfer apparatus 1A has an input member 179, an output member 181, a clutch 183 and an actuator 185.

The input member 179 and the output member 181 are arranged to face each other in the axial direction.

The clutch 183 is arranged between axially end faces 187, 189 of the input member 179 and the output member 181.

The output member 181 and the clutch 183 are integrally rotatably connected through a connection part 191. The connection part 191 is formed with an engaging tooth and has a cam that moves the clutch 183 in a connection direction of an intermittent part 193.

An urging member 195 that urges the clutch 183 in the connection direction of the intermittent part 193 is disposed between the output member 181 and the clutch 183.

The output member 181 and the clutch 183 are fitted, so that a centering part 197 is formed at which the rotational centers thereof are matched.

The intermittent part 193 is an engaging structure of a tooth 199 and a tooth 201 that are opposed to each other between the input member 179 and the clutch 183 in the axial direction.

The actuator 185 is supported between a case cover 29A and a case body 27A. The actuator 185 has an electric motor 203 that is supported to the case cover 29A and a shift fork 205. The shift fork 205 is screw-engaged with a motor shaft 207 that is supported between the case cover 29A and the case body 27A and is engaged with the clutch 183 in the first accommodation part 133. The shift fork 205 has a spring 207 that becomes a waiting mechanism when the opposing teeth 199, 201 of the intermittent part 193 are meshed.

A first bearing 13A is a ball bearing and second taper roller bearings 15Aa, 15Ab that are the second bearing are supported to a shaft support cylinder part 143A having bearing support parts 143Aa, 143Ab.

The ring gear 21A is integrally formed with the output member 181 of the first rotary shaft 9A and the second taper roller bearings 15Aa, 15Ab are fitted to bearing fitting parts 107Aa, 107Ab of a bearing fitting cylinder part 107A.

When the electric motor 203 starts, the shift fork 205 moves in a release direction of the intermittent part 193 against the urging force of the urging member 195 of the clutch 183. As the shift fork 205 moves, the clutch 183 moves against the urging force of the urging member 195. As the clutch 183 moves, the connection of the intermittent part 193 is released, so that the power transmission between the input member 179 and the output member 181 is interrupted.

The electric motor 203 is rotated in an opposite direction to thus move the shift fork 205 and to move the clutch 183 while the urging force of the urging member 195 is applied. As the clutch 183 is moved, the intermittent part 193 is connected, so that the power transmission between the input member 179 and the output member 181 is enabled.

In the Second Exemplary Embodiment, the mating surfaces 5, 7 are arranged to overlap with the outer diameter-side of the ring gear 21A, for example, so that the similar operational effects to the First Exemplary Embodiment can be obtained.

<Modified Embodiment>

The configuration of the power transmission apparatus may be applied to a final deceleration apparatus 69, by reversing the input/output relation of the transfer apparatus of the First or Second Exemplary Embodiment.

That is, referring to FIG. 1, a differential apparatus serving as the power transmission apparatus may include a differential case 76 of the differential apparatus and the drive pinion shaft 71 that serve as the first and second rotary shafts arranged to intersect with each other and are separately rotatably supported to a carrier case 79 by the first and second bearings and the third and fourth bearings, respectively. In the apparatus, a power is transferred by meshing rotation of the ring gear 77 and the pinion gear 73 serving as the first and second gears provided to the differential case 76 and the drive pinion shaft 71. The carrier case 73 has a dividable structure having a carrier case body 80 and a carrier case cover 84 that are joined with each other on mating surfaces 82, 86 intersecting with the differential case 76 and are fastened by fasteners 88 extending between the mating surfaces 82, 86.

The relations of the first and second bearings and the third and fourth bearings relative to the first and second rotary shafts and the shapes and fastening structure relations of the carrier case body 80 and the carrier case cover 84 may be similar to those of the transfer apparatus of the First or Second Exemplary Embodiment, so that it is possible to realize similar effects, as the power transmission apparatus.

<Others>

In the above Embodiments, the end portions of the parts 6, 8 of the mating surfaces 5, 7 positioned at the rear wheel-side output shaft 11-side are disposed between the shaft support cylinder part 151 and the seal support part 159. However, the end portions may be disposed between the third taper roller bearing 17 and the fourth taper roller bearing 19. Also in this case, the mating surfaces 5, 7 are put into contact with each other at the larger diameter-side than the fourth taper roller bearing 19 and are fastened by the bolts 25. At this time, the bolt holes may be formed in the thickness part of the case body 27 between the third taper roller bearing 17 and the fourth taper roller bearing 19 within a non-interference range.

According to embodiments, a power transmission apparatus 1 may include: a case 3; a first rotary shaft 9 extending in a first axial direction; a second rotary shaft 11 extending in a second axial direction intersecting with the first axial direction; a first gear 21 provided on the first rotary shaft 9; a second gear 23 provided on the second rotary shaft 11 and meshing with the first gear 21; a first bearing 13 and a second bearing 15 that rotatably support the first rotary shaft 9 with respect to the case 3; and a third bearing 17 and a fourth bearing 19 that rotatably support the second rotary shaft 11. The third bearing 17 may be positioned between the second gear 23 and the fourth bearing 19 in the second axial direction. The case 3 may include a first case member 27 and a second case member 29. The first case member 27 and the second case member 29 may be respectively formed with mating surfaces 5, 7 both intersecting with the first axial direction. The mating surface 5 of the first case member 27 and the mating surface 7 of the second case member 29 may be joined to each other. The first case member 27 may accommodate one side X of the first rotary shaft 9 in the first axial direction, the first bearing 13, the second rotary shaft 11, the third bearing 17, and fourth bearing 19. The second case member 29 may accommodate the other side Y of the first rotary shaft 9 in the first axial direction, and the second bearing 15. The mating surfaces 5, 7 may be disposed between the first bearing 13 and the second bearing 15 in the first axial direction. The first case member 27 may be formed with a hole 163 penetrating a part 6 of the mating surface 5 of the first case member 27 at a side of the second rotary shaft 11. A fastener 25 penetrating through the mating surfaces 5, 7 of the first case member 27 and the second case member 29 may be inserted through the hole 163. The fourth bearing 19 may be supported in a bearing support part 155 formed in the first case member 27. In a third direction perpendicular to both of the first axial direction and the second axial direction, a whole of said hole 163 may be positioned in one side in said third direction than an inner peripheral end of the bearing support part 155 in said one side in said third direction.

For example, according to the embodiment of FIG. 4, in the 3rd direction (which is up-down direction in FIG. 4), a whole of an upper hole 163 is arranged in an upper side of an upper side inner peripheral end of the bearing support part 155, and a whole of a lower hole 163 is arranged in a lower side of a lower side inner peripheral end of the bearing support part 155. In other words, the upper hole 163 is fully positioned in an upper side of an upper end of the fourth bearing 19, and the lower hole 163 is fully positioned in a lower side of a lower end of the fourth bearing 19.

In the first axial direction, the mating surfaces 5, 7 may be positioned between one end and the other end of first gear 21 in the first axial direction.

A distance $R_h$ between a rotational center of the second rotary shaft 11 and an inner peripheral end of said hole 163 to which the fastener 25 is inserted may be lager than a radius $R_B$ of an inner periphery of the bearing support part 155.

The power transmission apparatus 1 may include an additional fastener 25. The second rotary shaft 11 may be positioned between the fastener 25 and the additional fastener 25 in the third direction.

The first case member 27 may include an attachment part 137 to be fixed to a stationary member. The second rotary shaft 11 may be positioned between the attachment part 137 and the mating surface 5 of the first case member 27 in the first axial direction.

The second case member 29 may include a support cylinder part 146 having a bearing support part 143 that supports the second bearing 15 and a seal support part 145. The support cylinder part 146 of the second case member 29 may be positioned in the other side Y of the first axial direction than the mating surface 7 of the second case member 29.

The second case member 29 may be formed with a slope part 149 a diameter of which is enlarged from the other side Y to the one side X in the first axial direction.

The first case member 27 and the second case member 29 may be respectively formed with recess portions 10, 12 that are surrounded by parts 6, 8 of the mating surfaces 5, 7 positioned at the second rotary shaft-side and communicate with an accommodation part in which the second rotary shaft 11 is accommodated.

The first rotary shaft 9 may be hollow. The first gear 21 may be a ring gear, and a second gear 23 may be a pinion gear.

What is claimed is:

1. A power transmission apparatus comprising:
   a case;
   a first rotary shaft extending in a first axial direction;
   a second rotary shaft extending in a second axial direction intersecting with the first axial direction;
   a first gear provided on the first rotary shaft;
   a second gear provided on the second rotary shaft and meshing with the first gear;
   a first bearing and a second bearing that rotatably support the first rotary shaft with respect to the case; and
   a third bearing and a fourth bearing that rotatably support the second rotary shaft,
   wherein the third bearing is positioned between the second gear and the fourth bearing in the second axial direction;
   wherein the case includes a first case member and a second case member,
   wherein the first case member and the second case member are respectively formed with mating surfaces both intersecting with the first axial direction;

wherein the mating surface of the first case member and the mating surface of the second case member are joined to each other;

wherein the first case member accommodates one side of the first rotary shaft in the first axial direction, the first bearing, the second rotary shaft, the third bearing, and the fourth bearing, wherein the second case member accommodates the other side of the first rotary shaft in the first axial direction, and the second bearing, wherein the mating surfaces are disposed between the first bearing and the second bearing in the first axial direction, wherein the mating surfaces are disposed on a side of an entirety of the second bearing in the first axial direction in which the first bearing is disposed, wherein the first case member is formed with a hole penetrating a part of the mating surface of the first case member at a side of the second rotary shaft, wherein an entirety of the hole is disposed on a side of the third bearing in the second axial direction in which the fourth bearing is disposed, wherein a fastener penetrating through the mating surfaces of the first case member and the second case member is inserted through the hole, wherein the fourth bearing is supported in a bearing support part formed in the first case member, wherein, in a third direction perpendicular to both of the first axial direction and the second axial direction, a whole of said hole is positioned on one side of an inner peripheral end of the bearing support part.

2. The power transmission apparatus according to claim 1, wherein, in the first axial direction, the mating surfaces are positioned between one end and the other end of first gear.

3. The power transmission apparatus according to claim 1, wherein a distance between a rotational center of the second rotary shaft and an inner peripheral end of said hole to which the fastener is inserted is larger than a radius of an inner periphery of the bearing support part.

4. The power transmission apparatus according to claim 3, further comprising an additional fastener, wherein the second rotary shaft is positioned between the fastener and the additional fastener in the third direction.

5. The power transmission apparatus according to claim 1, wherein the first case member includes an attachment part to be fixed to a stationary member, and wherein the second rotary shaft is positioned between the attachment part and the mating surface of the first case member in the first axial direction.

6. The power transmission apparatus according to claim 1, wherein the second case member comprises a support cylinder part having a bearing support part that supports the second bearing and a seal support part, and wherein the support cylinder part of the second case member is positioned on an opposite side of the second case member in the first axial direction from the mating surface of the second case member.

7. The power transmission apparatus according to claim 1, wherein the second case member is formed with a slope part a diameter of which is enlarged from the other side to the one side in the first axial direction.

8. The power transmission apparatus according to claim 1, wherein the first case member and the second case member are respectively formed with recess portions that are surrounded by parts of the mating surfaces positioned at the second rotary shaft-side and communicate with an accommodation part in which the second rotary shaft is accommodated.

9. The power transmission apparatus according to claim 1, wherein the first rotary shaft is hollow, and wherein the first gear comprises a ring gear, and a second gear comprises a pinion gear.

* * * * *